Patented May 27, 1947

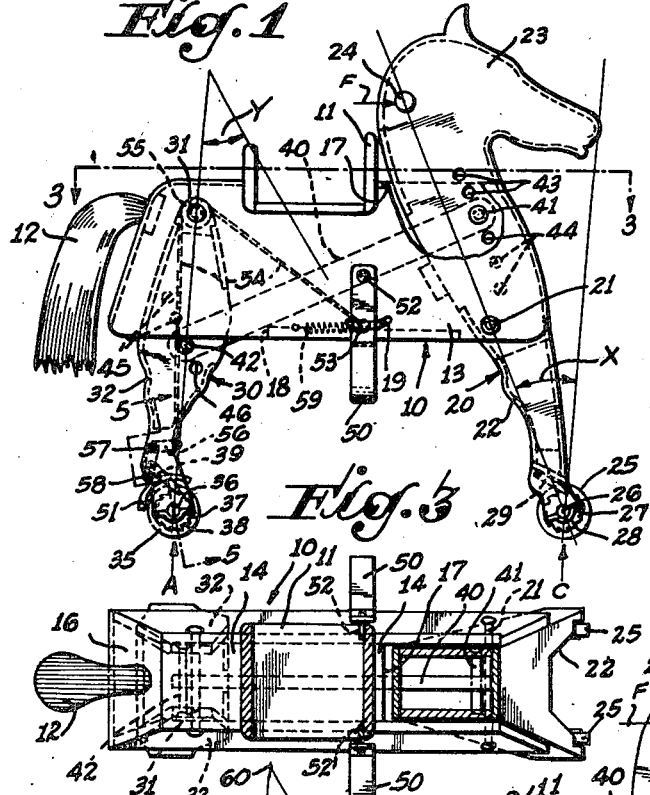

2,421,091

UNITED STATES PATENT OFFICE 2,421,091

MECHANICAL HORSE

Harold K. Sylvester, Redondo Beach, Calif., assignor of one-half to Howard C. Smith, Canoza Park, Los Angeles, Calif.

Application February 9, 1945, Serial No. 577,101

3 Claims. (Cl. 286—1.17)

My invention relates to mechanical horses and more particularly to a device of this character which can be propelled forwardly in a manner simulating the gallop of a live horse by manipulations of a rider seated thereon. It will be understood that although my invention is referred to as a mechanical horse, the inventive concept disclosed herein is by no means limited thereto.

The principles of operation applied to the design of most animated mechanical animals commit them to a singularly unlifelike type of motion. It is, therefore, a primary object of my invention to provide a mechanical horse capable of a rhythmic undulating forward motion closely emulating the gallop or its living counterpart. I prefer to attain this end by providing a body pivotally attached to front and rear sections incorporating fore and hind legs, respectively, whose pedal extremities terminate in wheels capable of forward rotation only, the front and rear sections being interconnected in a manner whereby they cooperate to propel the horse forwardly with a rhythmic galloping movement when a reciprocating fore and aft motion is imparted to the front section.

Another object of my invention is to provide a mechanical horse, operable by a child or unskilled rider, which will be a source of healthful exercise.

An additional object of my invention is to provide a means for varying the speed of the animal by a simple adjustment thereof.

A mechanical braking means for arresting the forward motion of the horse as desired is another salient feature of my invention.

Further objects and advantages of my invention will be made evident hereinafter.

Referring to the drawing:

Figure 1 is a side view of the mechanical horse illustrating the various components of the animating mechanism.

Figure 2 is a front view, partially in section, of my invention.

Figure 3 is a cross-sectional view taken along the line 3—3 of Figure 1.

Figure 4 is a schematic side view of the mechanical horse illustrating a part of the action cycle.

Figure 5 is an enlarged sectional view, taken along the line 5—5 of Figure 1, illustrating the pedal extremity of one hind leg in detail.

Figure 6 is an enlarged side view of the pedal extremity of one hind leg.

The mechanical horse includes a body 10 pivotally sustained by a front section 20 and a rear section 30, which are interconnected by a link 40, and is preferably of an appropriate size to permit operation thereof, as will hereinafter be described in detail, by a child seated astride the body 10 in a saddle 11 with his feet in stirrups 50. The device may be provided with the various appurtenances, such as a tail 12, incidental to the graphic representation of a horse, or other animal, and may be painted with various colors as desired.

The body 10 preferably comprises a pair of lateral sides or flanks 13 joining an upper surface or back 14, a nether surface 15, and a posterior surface 16. The front section 20, which is embraced by the flanks 13 and pivotally attached to the forward ends thereof by a transverse shaft or pivot 21, includes a pair of forelegs 22 connected to a head 23 which is provided with a handle 24, the pedal extremity of each foreleg 22 being provided with a wheel 25 rotatably attached thereto by a transverse axle 26. Each fore wheel 25 is equipped with a ratchet hub 27 having peripheral teeth 28 engageable by a pawl 29 which is pivotally attached to the foreleg 22, thereby preventing rearward rotation of the wheel 25 while permitting forward rotation thereof.

The rear section 30, which is partially enclosed by the flanks 13, back 14, and posterior surface 16, is attached to the rearward ends of the flanks 13 by a transverse shaft or pivot 31, and comprises a pair of hind legs 32, each terminating in a wheel 35 rotatably attached thereto by a transverse axle 36, as best illustrated in Figures 5 and 6. Each hind wheel 35 incorporates a ratchet hub 37 having peripheral teeth 38 engageable by a pawl 39 in the manner and for the purpose previously discussed in conjunction with the description of the fore wheels 25.

The front and rear sections, 20 and 30, are interconnected by an elongated rigid link 40, adapted to transmit reciprocating motion therebetween, which is pivotally attached at its forward end to the front section 20 by a transverse pivot 41 and at its rearward end to the rear section 30 by another transverse pivot 42. The interconnecting link 40 effects cooperation between the front and rear sections, 20 and 30, whereby a reciprocating fore and aft motion imparted to the front section 20 by an alternating force applied to the handle 24 serves to propel the mechanical horse forwardly with a rhythmic undulating motion simulating the gallop of a live horse.

A complete comprehension of the functioning of the animating mechanism can best be achieved by a consideration of Figures 1 and 4. A rider, seated in the saddle 11 astride the body 10 with his feet in the stirrups 50 and with his hands grasping the handle 24, can propel the mechanical horse forwardly from the position shown in Figure 1 to the position delineated by the solid lines of Figure 4 by exerting a forward force on the handle 24, as indicated by the arrow F. Since rearward rotation of the fore wheels 25 is prevented by engagement of the pawls 29 with the teeth 28 of the ratchet hub 27, the entire front section 20 is rotated through the angle X about the axles 26 of the fore wheels 25 which remain at the position indicated by the arrow C. The rotation of the front section 20 is transmitted through the link 40 by means of the link pivots 41, 42 to the rear section 30 which rotates forwardly through the angle Y about a point 60, whereby the hind wheels 35 roll forwardly from the position indicated by the arrow A of Figure 1 to the position indicated by the arrow B of Figure 4, as illustrated by the arrow 61. The front-section pivot 21 and the rear-section pivot 31 also cooperate with the body 10 to effect forward progress and rearward inclination thereof as delineated by the solid lines of Figure 4, the forward progress being denoted by the dimension 62.

The rider may then complete the action cycle by exerting a rearward force on the handle 24, as indicated by the arrow R, thereby propelling the mechanical horse forwardly to the position indicated by the broken lines of Figure 4, which corresponds to the position illustrated in Figure 1. In moving to this second position the front section 20 rotates forwardly through the angle X' about a point 63 whereby the fore wheels 25 roll forwardly from the position indicated by the arrow C to the position indicated by the arrow D, as illustrated by the broken arrow 64. The rotation imparted to the front section 20 is transmitted through the link 40 to the rear section 30, which, since rearward rotation of the hind wheels 35 is prevented, rotates forwardly through the angle Y' about the axles 36 of the hind wheels 35, the latter remaining at the position indicated by the arrow B. The front-section and rear-section pivots, 21 and 31, act upon the body 10 to effect forward progress thereof, as indicated by the dimension 65, and to restore it to a substantially horizontal position, as illustrated by the broken lines.

The magnitude of the reciprocating fore and aft motion of the front and rear sections, 20 and 30, is limited by stops, 17 and 18, which engage the front and rear sections, 20 and 30, respectively. The stop 17 limits the travel of the front section 20 during application of a rearward force R to the handle 24 and is perferably formed by the forward edge 17 of the upper surface, or back, 14. The stop 18 is similarly formed by the aft edge of the nether surface 15 and serves to arrest the forward rotation of the rear section 30 upon application of a forward force F to the handle 24.

Thus a rider may propel the mechanical horse forwardly with a continuous motion by alternately pushing and pulling on the handle 24, the rhythmic undulating motion of the body 10 creating the sensation characteristic of the gallop of a live steed. The manner in which the angle embraced by the front and rear sections, 20 and 30, alternately becomes acute and obtuse, as the head 23 moves forwardly and rearwardly, closely simulates the leg action of a live horse at full gallop. The natural, life-like action of the entire mechanical animal is specifically attributable to the manner in which the body 10 tilts rearwardly and the head 23 reaches out as the hind legs 32 advance toward the fore legs 22 to form the acute angle therebetween during part of the action cycle, thereby emulating the bunching of the legs of a horse about to initiate a forward leap or stride. The mechanical horse effects this forward leap during the remainder of the action cycle in which the body 10 returns to a horizontal position and the head 23 moves aft as the forelegs 22 reach out away from the hind legs 32 to form the obtuse angle therebetween. The complete action cycle may be repeated until the mechanical horse reaches a speed limited only by the energy of the rider. Upon attaining a desired speed, the rider may allow the device to coast, impelled by its forward momentum, which may be considerable.

As a precautionary measure, I prefer to equip the horse with a means for braking the forward motion as desired. The braking means, as best shown in Figures 1 and 6, preferably comprises a brake shoe 51 disposed adjacent each hind wheel 35 and adapted to effect engagement therewith upon application of a forward force to the stirrups 50 by the feet of the rider, each stirrup 50 being pivotally attached to one flank 13 of the body 10 by a transverse pivot 52 and each having a transverse peg 53 connected thereto and extending inwardly therefrom through a slot 19 in the flank 13. The forward movement imparted to the stirrups 50 is transmitted by means of a mechanism comprising a cable 54 which is trained over a pulley 55 to connect the peg 53 and a crank 56 for the purpose of rotating the latter about a pivot 57 which is connected to the hind leg 32, as best shown in Figure 6, the rotation of the crank 56 serving to urge the brake shoe 51 into engagement with the hind wheel 35 by virtue of the aligning action of a pivot 58 interconnecting the crank 56 and the brake shoe 51. A spring 59 is preferably attached to each stirrup 50 and the adjacent flank 13 to assist in preventing inadvertent application of the brake shoes 51 to the wheels 35.

The amplitude of the rocking motion developed by the mechanical horse and the forces required to effect the operation thereof can be modified readily to suit the fancy of the individual rider by transferring the pivot 41 at the forward end of the link 40 to any one of auxiliary holes 43 or 44. Transferring the pivot 41 to one of the holes 43 will increase the angular deflection Y of the rear section 30 for a given angular displacement X of the front section 20 and hence will increase the amplitude of motion of the body 10 by permitting the rearward inclination thereof to increase during forward travel of the hind wheels 35. The forward progress made per cycle will also be increased and the forces applied to the handle 24 will of necessity increase in proportion to the displacement of the pivot point 41. Similarly, the amplitude of motion, the forward advance per cycle, and the operating forces may be decreased by transferring the pivot 41 to one of the holes 44. Additional holes 45 and 46 may be provided in the rear section 30 to accommodate the pivot 42 at the aft end of the link 40, use of the holes 45 effecting an increase of the amplitude of undulating motion, the forward advance per cycle, and the operating forces, and use of the hole 46 effecting a decrease thereof. Further modification may be attained by employing a link 40 of a length suitable to cooperate with any desired pair of holes, one being selected from each of the groups 43, 44 and 45, 46.

The embodiment of my invention herein described in specific detail for the purposes of disclosure and to illustrate an application of the principles involved will suggest to those skilled in the art various modifications and substitutions that do not depart from the underlying inventive concept; I do not desire to be limited to the specific illustration disclosed herein and I hereby reserve the right to all such modifications and substitutions that properly come within the scope of the appended claims.

I claim as my invention:

1. A mechanical horse comprising: a body provided with a front pivot adjacent the nether surface thereof, a rear pivot adjacent the upper surface thereof, and a stirrup pivotally mounted on each flank thereof; a front section pivotally attached to said body by said front pivot, said front section including a head with a handle attached thereto and a pair of forelegs; a rear section pivotally attached to said body by said rear pivot and including a pair of hind legs; a wheel rotatably attached to the pedal extremity of each leg, said wheels including ratchets adapted to be engaged by pawls pivotally attached to said legs whereby rearward rotation of said wheels is prevented; a link pivotally attached to said front section above said front pivot and to said rear section below said rear pivot and adapted to transmit reciprocating motion therebetween; and means actuatable by said stirrups for braking the wheels attached to said hind legs.

2. A mechanical horse as defined in claim 1 in which said braking means includes a crank-actuated brake shoe operatively connected to said stirrups by a cable whereby a forward displacement of said stirrups urges said brake shoes into engagement with the rims of said hind wheels.

3. In a mechanical device simulating a horse, the combination of: a substantially horizontal body provided with a front pivot adjacent the nether surface thereof, a rear pivot adjacent the upper surface thereof, and a stirrup pivotally connected to each flank thereof; a front section pivotally attached to said body by said front pivot, said front section comprising a pair of fore legs and a head provided with a handle; a rear section pivotally joined to said body by said rear pivot, said rear section including a pair of hind legs; a wheel rotatably attached to each leg adjacent the pedal extremity thereof, said wheels having means incorporated therewith for preventing rearward rotation thereof; an elongated, substantially rigid, link pivotally attached to said rear section below said rear pivot and to said front section above said front pivot; means for adjusting the vertical position of the pivotal attachment of said link to said front section; and stirrup-actuated means for braking said hind wheels including crank-actuated brake shoes, connected to said stirrups by a cable, adapted to engage said hind wheels.

HAROLD K. SYLVESTER.

REFERENCES CITED

The following references are of record in the file of this patent:

UNITED STATES PATENTS

| Number | Name | Date |
|---|---|---|
| 1,440,088 | Kroher | Dec. 26, 1922 |
| 1,561,639 | Edgar | Nov. 17, 1925 |
| 1,742,737 | Toth | Jan. 7, 1930 |
| 1,777,237 | Watson | Sept. 30, 1930 |
| 1,819,029 | King et al. | Aug. 18, 1931 |
| 1,894,160 | Clark | Jan. 10, 1933 |
| 2,237,605 | Maypole | Apr. 8, 1941 |